(12) United States Patent  
Seo

(10) Patent No.: US 10,774,743 B2  
(45) Date of Patent: Sep. 15, 2020

(54) PARTICLE REMOVAL DEVICE FOR GAS TURBINE AND GAS TURBINE INCLUDING THE SAME

(71) Applicant: Doosan Heavy Industries & Construction Co., Ltd., Changwon-si, Gyeongsangnam-do (KR)

(72) Inventor: Jawon Seo, Daejeon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 295 days.

(21) Appl. No.: 15/842,514

(22) Filed: Dec. 14, 2017

(65) Prior Publication Data

US 2018/0291809 A1  Oct. 11, 2018

(30) Foreign Application Priority Data

Apr. 6, 2017  (KR) .................. 10-2017-0044983

(51) Int. Cl.
  *F01D 9/06*  (2006.01)
  *F02C 7/052*  (2006.01)
  (Continued)

(52) U.S. Cl.
  CPC .............. *F02C 7/052* (2013.01); *B01D 45/16* (2013.01); *F01D 5/081* (2013.01); *F01D 9/02* (2013.01);
  (Continued)

(58) Field of Classification Search
  CPC ............................................. F05D 2260/607
  See application file for complete search history.

(56) References Cited

U.S. PATENT DOCUMENTS 4,820,123 A * 4/1989 Hall .................. F01D 5/081  
                                                                    416/92  
6,134,874 A  10/2000 Stoten  
(Continued)

FOREIGN PATENT DOCUMENTS

JP  1990-023202 A  1/1990  
JP  08-177526 A  7/1996  
(Continued)

OTHER PUBLICATIONS

A Japanese Office Action dated Oct. 16, 2018 in connection with Japanese Patent Application No. 2017-234937 which corresponds to the above-referenced U.S. application.
(Continued)

*Primary Examiner* — Gerald L Sung  
*Assistant Examiner* — Rene D Ford  
(74) *Attorney, Agent, or Firm* — Invenstone Patent, LLC

(57) ABSTRACT

A particle removal device for a gas turbine includes a suction inlet formed in one side of a region below a first vane so as to introduce a compressed air discharged from a compressor, a combusted gas generated in a combustor flowing through the first vane, an acceleration flow path for accelerating the compressed air introduced through the suction inlet so as to separate particles from the compressed air by centrifugal force, a particle collector provided at one end of the acceleration flow path so as to collect the separated particles, and a particle discharger communicating with the particle collector so as to discharge the collected particles to an outside.

20 Claims, 5 Drawing Sheets

(51) Int. Cl.
  *F01D 5/08*    (2006.01)
  *F01D 25/12*   (2006.01)
  *F02C 7/18*    (2006.01)
  *F01D 9/02*    (2006.01)
  *B01D 45/16*   (2006.01)
  *F04D 29/54*   (2006.01)
  *F02C 3/04*    (2006.01)

(52) U.S. Cl.
  CPC ............... *F01D 25/12* (2013.01); *F02C 7/18* (2013.01); *F04D 29/542* (2013.01); *F02C 3/04* (2013.01); *F05D 2220/32* (2013.01); *F05D 2220/3212* (2013.01); *F05D 2240/12* (2013.01); *F05D 2240/35* (2013.01); *F05D 2260/607* (2013.01); *Y02T 50/671* (2013.01); *Y02T 50/676* (2013.01)

(56) References Cited

U.S. PATENT DOCUMENTS

| | | | |
|---|---|---|---|
| 6,413,044 B1* | 7/2002 | Roeloffs | F01D 5/187 |
| | | | 415/169.1 |
| 6,499,285 B1 | 12/2002 | Snyder | |
| 2005/0002778 A1* | 1/2005 | Fried | F01D 5/082 |
| | | | 415/169.1 |
| 2008/0028935 A1 | 2/2008 | Andersson | |
| 2008/0310951 A1* | 12/2008 | Bremer | F01D 5/081 |
| | | | 415/121.2 |
| 2009/0081024 A1 | 3/2009 | Tibbott | |
| 2010/0196167 A1* | 8/2010 | Ammann | F01D 5/082 |
| | | | 416/97 R |
| 2011/0247347 A1 | 10/2011 | Ebert et al. | |
| 2011/0250057 A1* | 10/2011 | Laurello | F01D 5/081 |
| | | | 415/180 |
| 2014/0119903 A1 | 5/2014 | Suciu et al. | |
| 2014/0290254 A1* | 10/2014 | Manning | F01D 9/02 |
| | | | 60/752 |
| 2015/0345331 A1* | 12/2015 | Murray | F01D 25/24 |
| | | | 415/220 |
| 2017/0082027 A1* | 3/2017 | Zelesky | F01D 5/081 |
| 2018/0291809 A1* | 10/2018 | Seo | B01D 45/16 |

FOREIGN PATENT DOCUMENTS

| | | |
|---|---|---|
| JP | 2014-031750 A | 2/2014 |
| KR | 1982-0001469 B1 | 8/1982 |
| KR | 20-1996-0016461 U | 6/1996 |
| KR | 10-1647261 B1 | 8/2016 |
| WO | WO-2014/149353 A1 | 9/2014 |

OTHER PUBLICATIONS

European Search Report dated Jun. 13, 2018 in European Application No. 17206875.1.

Office Action dated Jan. 16, 2018 in Korean Application No. 10-2017-0044983.

* cited by examiner

PARTICLE REMOVAL DEVICE FOR GAS TURBINE AND GAS TURBINE INCLUDING THE SAME

CROSS-REFERENCE TO RELATED APPLICATION

This application claims the benefit of Korean Patent Application No. 10-2017-0044983, filed Apr. 6, 2017, the disclosure of which is herein incorporated by reference in its entirety.

BACKGROUND OF THE INVENTION

Field of the Invention

The present invention relates to a particle removal device for a gas turbine and a gas turbine including the same.

Description of the Related Art

Generally, a gas turbine includes a compressor, a combustor, and a turbine. The compressor compresses external air introduced from the outside and transfers the compressed air to the combustor. The air compressed in the compressor becomes high-pressure and high-temperature air. The combustor mixes the compressed air, introduced from the compressor, with fuel, and combusts the mixed air. The combusted gas generated from the combustion is discharged to the turbine. The turbine is rotated by the combusted gas, thereby generating power. The generated power is used in various fields such as for the generation of electricity and to drive machinery.

The gas turbine is a power engine, which is configured to mix air, compressed in a compressor, with fuel, combust the mixed air, and rotate a turbine by using the high temperature gas generated by the combustion. The gas turbine is used to drive a generator, an aircraft, a locomotive, and the like.

Some of the compressed air discharged from the compressor is supplied to a combustor, and the remaining compressed air is supplied to a first vane close to the combustor so as to cool the first vane. At this point, because the compressed air supplied to the first vane contains various kinds of particles, such as dust and foreign substances, there is a problem whereby a flow path is clogged due to the particles such as dust.

Related Art Document

Patent Document

Korean Patent Registration No. 10-0013120 (titled "Combustion apparatus for gas turbine engine").

SUMMARY OF THE INVENTION

Therefore, the present invention has been made in view of the above problems, and the present invention provides a particle removal device for a gas turbine and a gas turbine including the same, which are able to collect and remove particles, such as foreign substances, contained in compressed air supplied to a first vane, thereby inhibiting clogging of a flow path.

In accordance with an aspect of the present invention, a particle removal device for a gas turbine comprises a suction inlet formed in one side of a region below a first vane so as to introduce a compressed air discharged from a compressor, a combusted gas generated in a combustor flowing through the first vane, an acceleration flow path for accelerating the compressed air introduced through the suction inlet so as to separate particles from the compressed air by centrifugal force, a particle collector provided at one end of the acceleration flow path so as to collect the separated particles, and a particle discharger communicating with the particle collector so as to discharge the collected particles to an outside.

In an aspect of the present invention, the acceleration flow path may include an inclined surface adapted not only to enable compressed air, which is introduced in a direction parallel to an axial direction of the gas turbine, to be introduced into the first vane in a direction perpendicular to the axial direction of the gas turbine but also to accelerate the compressed air.

In an aspect of the present invention, the particle collector may be formed in a first support member supporting a platform of the first vane, and the first support member may be provided at an end of the acceleration flow path and may have a size larger than a width of a lower end of the platform of the first vane.

In an aspect of the present invention, the particle discharger may be formed in a lower portion of the first support member so as to have a pipe shape.

In an aspect of the present invention, the particle removal device may further include a first guide member projecting from a second support member supporting a platform of the first vane, in a downward direction or in a direction perpendicular to an inclined surface of the acceleration flow path.

In an aspect of the present invention, the particle removal device may further include a second guide member projecting from a side surface of a first support member supporting a platform of the first vane, in a horizontal direction.

In an aspect of the present invention, the particle removal device may further include a third guide member projecting from a side end of the acceleration flow path in a horizontal direction.

In an aspect of the present invention, the particle removal device may further include a subsidiary particle collector formed in a portion of an inclined surface of the acceleration flow path.

In an aspect of the present invention, the subsidiary particle collector may include a connecting passage communicating with the particle collector.

In an aspect of the present invention, the particle removal device may further include a first guide member, projecting from a second support member supporting a platform of the first vane in a downward direction or in a direction perpendicular to an inclined surface of the acceleration flow path, a second guide member, projecting from a side surface of a first support member supporting the platform of the first vane in a horizontal direction, a third guide member projecting from a side end of the acceleration flow path in the horizontal direction, and a subsidiary particle collector formed in a portion of the inclined surface of the acceleration flow path.

In accordance with another aspect of the present invention, a gas turbine comprises a compressor for compressing air, a combustor for mixing a first compressed air, introduced from the compressor, with fuel, a turbine adapted to be rotated by a combusted gas supplied from the combustor so as to generate power, and a particle removal device including a suction inlet formed in one side of a region below a first vane so as to introduce a second compressed air discharged from the compressor, the combusted gas generated in the combustor flowing through the first vane, an acceleration flow path for accelerating the second compressed air introduced through the suction inlet so as to separate particles from the second compressed air by centrifugal force, a particle collector provided at one end of the acceleration flow path so as to collect the separated particles, and a particle discharger communicating with the particle collector so as to discharge the collected particles to outside of the turbine.

In an aspect of the present invention, the acceleration flow path may include an inclined surface adapted not only to enable the second compressed air, which is introduced in a direction parallel to an axial direction of the gas turbine, to be introduced into the first vane in a direction perpendicular to the axial direction of the gas turbine but also to accelerate the second compressed air.

In an aspect of the present invention, the particle collector may be formed in a first support member supporting a platform of the first vane, and the first support member may be provided at an end of the acceleration flow path and may have a size larger than the width of a lower end of the platform of the first vane.

In an aspect of the present invention, the particle discharger may be formed in a lower portion of the first support member so as to have a pipe shape.

In an aspect of the present invention, the gas turbine may further include a first guide member projecting from a second support member supporting a platform of the first vane, in a downward direction or in a direction perpendicular to an inclined surface of the acceleration flow path.

In an aspect of the present invention, the gas turbine may further include a second guide member projecting from a side surface of a first support member supporting a platform of the first vane, in a horizontal direction.

In an aspect of the present invention, the gas turbine may further include a third guide member projecting from a side end of the acceleration flow path in a horizontal direction.

In an aspect of the present invention, the gas turbine may further include a subsidiary particle collector formed in a portion of an inclined surface of the acceleration flow path. In an aspect of the present invention, the subsidiary particle collector may include a connecting passage communicating with the particle collector.

In the aspect of the present invention, the gas turbine may further include a first guide member, projecting from a second support member supporting a platform of the first vane in a downward direction or in a direction perpendicular to an inclined surface of the acceleration flow path, a second guide member, projecting from a side surface of a first support member supporting the platform of the first vane in a horizontal direction, a third guide member, projecting from a side end of the acceleration flow path in the horizontal direction, and a subsidiary particle collector formed in a portion of the inclined surface of the acceleration flow path.

BRIEF DESCRIPTION OF THE DRAWINGS

The above and other features of the present invention will be more clearly understood from the following detailed description taken in conjunction with the accompanying drawings, in which.

DETAILED DESCRIPTION OF THE INVENTION

Figure 1:
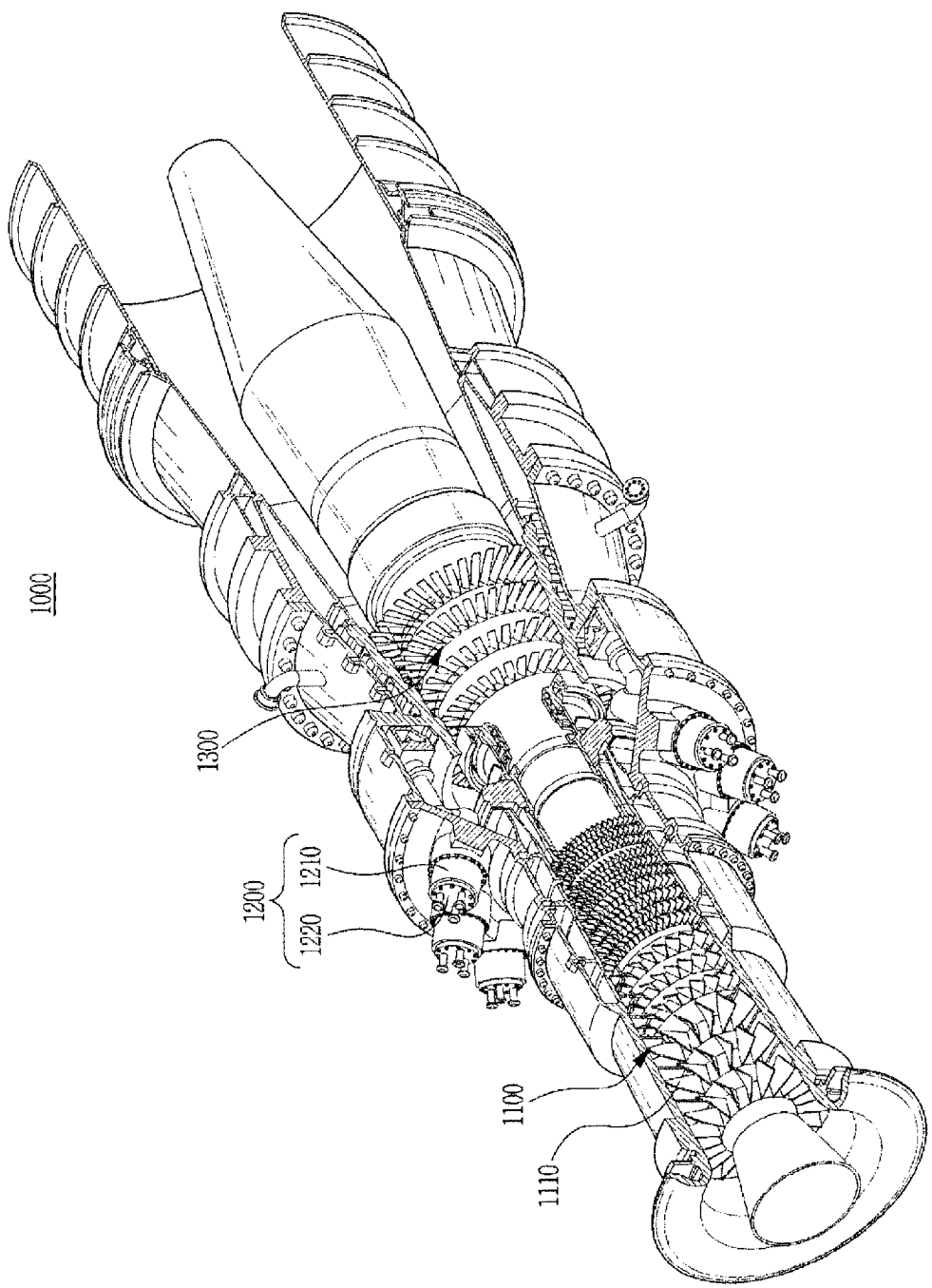
FIG. 1 is a view illustrating a gas turbine according to an embodiment of the present invention.

Since embodiments of the present invention can be variously modified in many different forms, reference will now be made in detail to specific embodiments of the present invention. It is to be understood that the present description is not intended to limit the present invention to those specific embodiment and that the present invention is intended to cover not only the specific embodiments but also various alternatives, modifications, equivalents and other embodiments that may be included within the spirit and scope of the present invention as defined by the appended claims.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Preferred embodiments of the present invention will be described more fully hereinafter with reference to the accompanying drawings. In the accompanying drawings, it should be noted that the same components are described using the same reference numerals as far as possible. In the following description of the present invention, detailed descriptions of known functions and components incorporated herein will be omitted when the same may make the subject matter of the present invention unclear. For the same reason, some components in the drawings may be exaggerated, omitted or diagrammatically illustrated.

Figure 2:
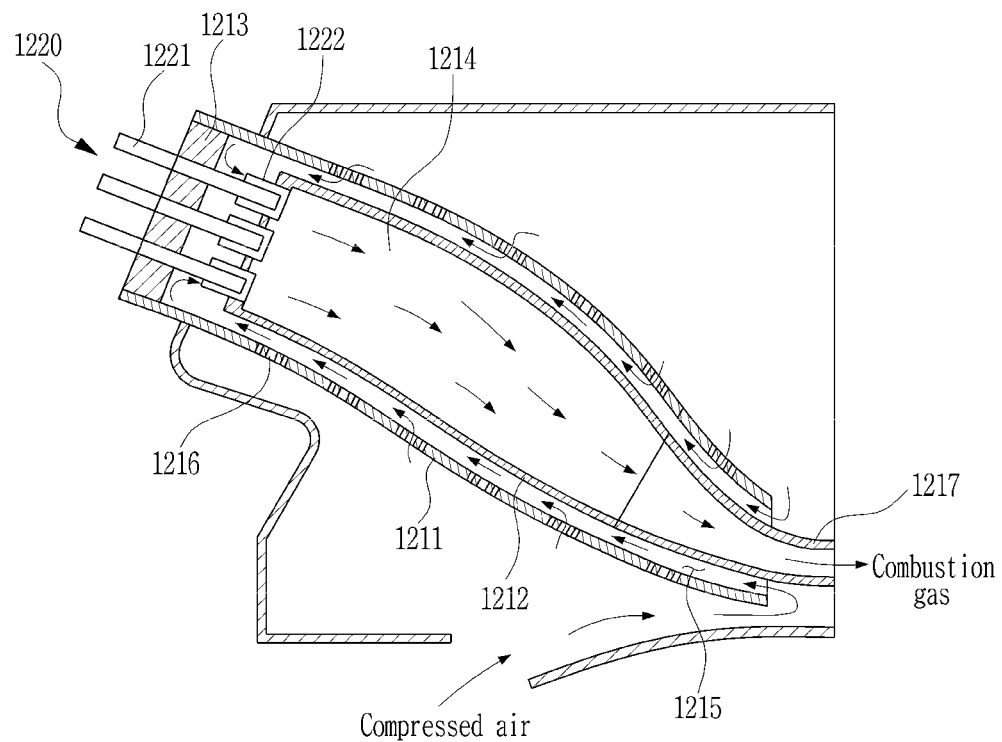
FIG. 2 is a cross-sectional view illustrating a combustor of the gas turbine.

FIG. 1 is a view illustrating the internal structure of a gas turbine according to an embodiment of the present invention, and FIG. 2 is a view illustrating a combustor of the gas turbine.

Referring to FIGS. 1 and 2, the gas turbine 1000 according to the embodiment of the present invention includes a compressor 1100, a combustor 1200, and a turbine 1300. The compressor 1100 includes a plurality of blades 1110, which are arranged in a radial fashion. The compressor 1100 rotates the plurality of blades 1110, and air is thus moved while being compressed due to the rotation of the blades 1110. The size and mounting angle of the blades 1110 may be varied depending on the mounting position. In an embodiment, the compressor 1100 may be directly or indirectly connected to the turbine 1300 so as to receive some of the power generated by the turbine 1300, which is in turn used to rotate the blades 1110.

The air compressed in the compressor 1100 is moved to the combustor 1200. The combustor 1200 includes a plurality of combustion chambers 1210 and a plurality of fuel nozzle modules 1220, which are arranged in a circular pattern.

Each of the plurality of combustion chambers 1210 includes a sleeve 1211, a combustion liner 1212, a fuel nozzle base 1213, and a combustion zone 1214. The sleeve 1211 defines an external wall of the combustion chamber 1210, and extends in one direction. The sleeve 1211 may be configured to have a cylindrical shape. The combustion liner 1212 is spaced apart from the sleeve 1211 by a predetermined distance such that an annular flow space 1215 is defined between the sleeve 1211 and the combustion liner 1212. The fuel nozzle base 1213 is fitted into an end of the sleeve 1211 so as to hermetically seal the sleeve 1211. The fuel nozzle base 1213 may be coupled to a manifold for supplying fuel to fuel nozzles 1221, the associated valves and the like. The combustion zone 1214 is a space in which combustion actually occurs and is defined by a part of the combustion liner 1212.

The fuel nozzle module 1220 is mounted in the combustion chamber 1210. The fuel nozzle module 1220 includes a plurality of fuel nozzle assemblies. The number of fuel nozzle assemblies may be varied depending on the capacity of the gas turbine 1000.

Each of the plurality of fuel nozzle assemblies includes a fuel nozzle 1221 and a shroud 1222. A single combustion chamber 1210 may be provided therein with a plurality of fuel nozzle assemblies. Fuel required for combustion is injected through the fuel nozzle 1221. The fuel nozzle 1221 is supported at one end thereof by the fuel nozzle base 1213. The shroud 1222 is configured to surround the fuel nozzle 1221 in a state of being spaced apart from the fuel nozzle 1221. The shroud 1222 may be configured to have a pipe shape, preferably a circular pipe shape. The fuel nozzle 1221 may be provided with a swirling vane (not shown), which is inwardly located at a predetermined distance from an inlet of the shroud 1222. The combustion liner 1212 is provided at a rear end thereof with a transition piece 1217 for supplying combusted gas to the turbine 1300. The transition piece 1217 may be provided with a flow path for the acceleration of gas. Like the combustion liners 1212, a plurality of transition pieces 1217 may be arranged in a circular pattern at a connection region of the turbine 1300.

The air compressed in the compressor 1100 is introduced through cooling holes 1216 formed in the sleeve 1211, and flows along the flowing space 1215 while cooling the combustion liner 1212. The compressed air, which flows along the flowing space 1215, reaches the fuel nozzle base 1213 positioned at the end of the sleeve 1211. The compressed air turns its flowing direction at the fuel nozzle base 1213, and is introduced into the inlet of the shroud 1222 of the fuel nozzle assembly 1220. The compressed air, which is introduced into the shroud 1222, is moved to the combustion zone 1214 while being mixed with fuel injected through the fuel nozzles 1221. The compressed air is ignited in the combustion zone 1214 by means of a spark plug (not shown). Subsequently, the combusted gas is discharged to the turbine 1300 so as to rotate the turbine 1300.

Figure 3:
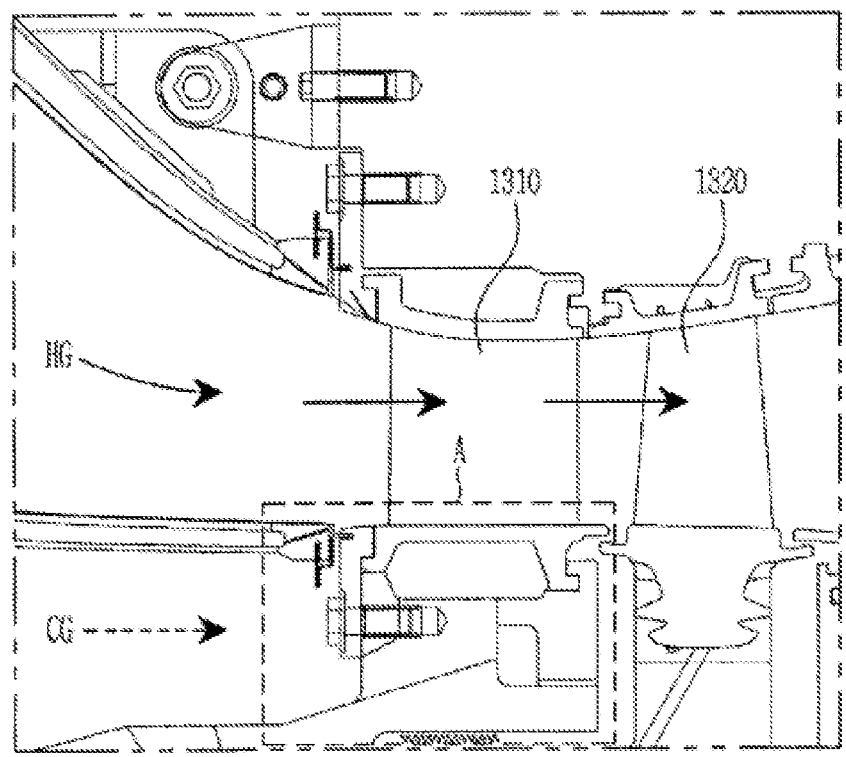
FIG. 3 is a view illustrating a portion of a turbine according to the embodiment of the present invention.
Figure 4:
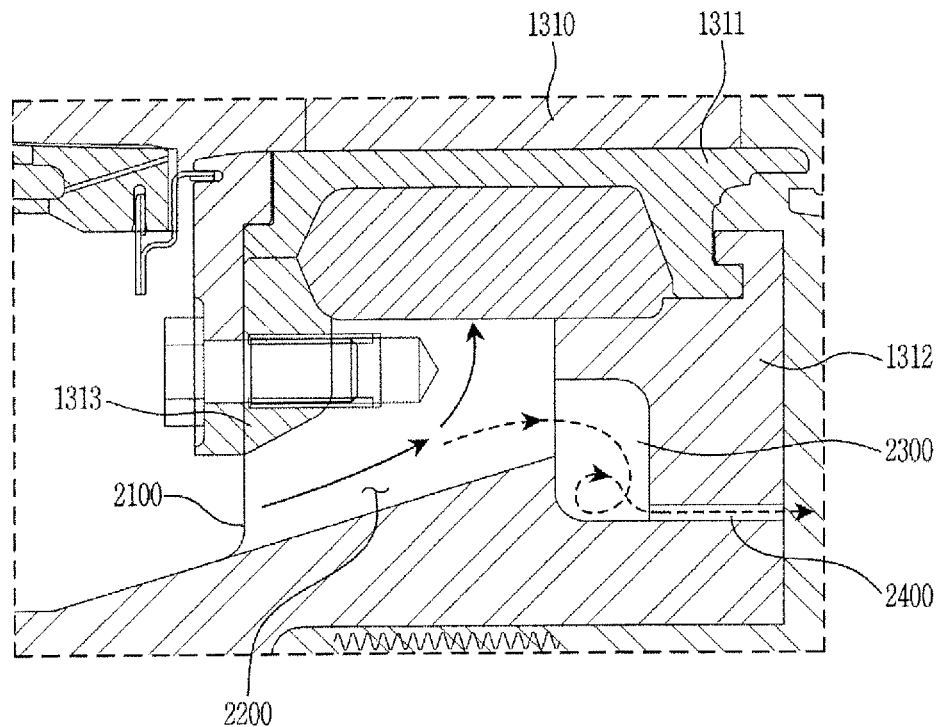
FIG. 4 is an enlarged view of portion "A" of FIG. 3, which shows a particle removal device according to a first embodiment of the present invention.

FIG. 3 is a view illustrating a portion of the turbine according to the embodiment of the present invention, and FIG. 4 is an enlarged view of portion "A" of FIG. 3, which shows a particle removal device according to a first embodiment of the present invention.

Referring to FIG. 3, the turbine 1300 may be configured such that turbine vanes including a first vane 1310 and turbine blades including a first turbine blade 1320 are alternately arranged in the axial direction of the gas turbine. Combusted gas HG having a high temperature rotates the turbine blades while passing through the turbine vanes and the turbine blades in the axial direction.

Some of the compressed air CG discharged from the compressor is supplied to the turbine vanes so as to cool the turbine vanes. The one among the plurality of turbine vanes that is first cooled by the compressed air discharged from the compressor 1100 is the first vane 1310.

Although a filter (not shown), which is adapted to remove particles such as dust contained in the compressed air, is disposed in front of the first vane 1310 so as to be close to the compressor, the compressed air passed through the filter still contains fine particles, which may cause the flow path for compressed air defined by the first vane to be clogged. Accordingly, embodiments of the present invention provide the particle removal device, which is provided below the first vane 1310 so as to remove particles contained in the compressed air introduced into the first vane 1310.

Referring to FIG. 4, the particle removal device according to the first embodiment of the present invention includes a suction inlet 2100, an acceleration flow path 2200, a particle collector 2300, and a particle discharger 2400.

The suction inlet 2100 is formed in the front side of a region below the first vane 1310 (the side close to the compressor), through which the combusted gas generated in the combustor 1200 flows, so as introduce the compressed air discharged from the compressor 1100. The shape and the size of the suction inlet 2100 may be varied depending on size and mounting position of the first vane 1310. In order to improve suction efficiency, the suction inlet 2100 may comprise a plurality of suction inlets.

The acceleration flow path 2200 accelerates the compressed air, which is introduced through the suction inlet 2100, so as to separate particles from the compressed air by centrifugal force. In order to accelerate the compressed air while allowing the compressed air, which is introduced in the axial direction, to be introduced into the first vane 1310 in a direction perpendicular to the axial direction, the acceleration flow path 2200 is configured to be inclined with respect to the axial direction at a predetermined angle. Particles having a relatively large mass, such as dust and foreign substances, flow along a trajectory having a radius larger than that of the compressed air having a relatively low mass while the compressed air introduced through the suction inlet 2100 passes through the acceleration flow path 2200. Consequently, the particles are separated from the compressed air by centrifugal force (inertial force).

The separated particles are collected in the particle collector 2300 formed in the end of the acceleration flow path 2200. The particle collector 2300 may be formed in a first support member 1312 supporting a platform 1311 of the first vane 1310 so as to have a pocket shape. The first support member 1312 is provided at the end of the acceleration flow path 2200, and has a width larger than the width of a lower end of the platform 1311 of the first vane 1310. The particle collector 2300 may be formed by depressing an upstream region of a lower portion of the first support member 1312. Therefore, the particle collector 2300 may be formed merely changing a shape of the support member 1312, even without providing an existing gas turbine with an additional space.

The particles, such as dust, collected in the particle collector 2300 are discharged to the outside through the particle discharger 2400. The particle discharger 2400 communicates with the particle collector 2300. The particle discharger 2400 may be formed in the lower portion of the first support member 1312 so as to have a pipe shape.

The particle removal device according to the embodiment of the present invention is able to collect and remove particles, such as foreign substances, contained in compressed air supplied to the first vane 1310, thereby inhibiting the flow path from being clogged.

Next, particle removal devices according to second to sixth embodiments of the present invention will be described. In the following description, since the suction inlet 2100, the acceleration flow path 2200, the particle collector 2300, and the particle discharger 2400 are substantially identical to those of the first embodiment, a description thereof is omitted.

Figure 5:
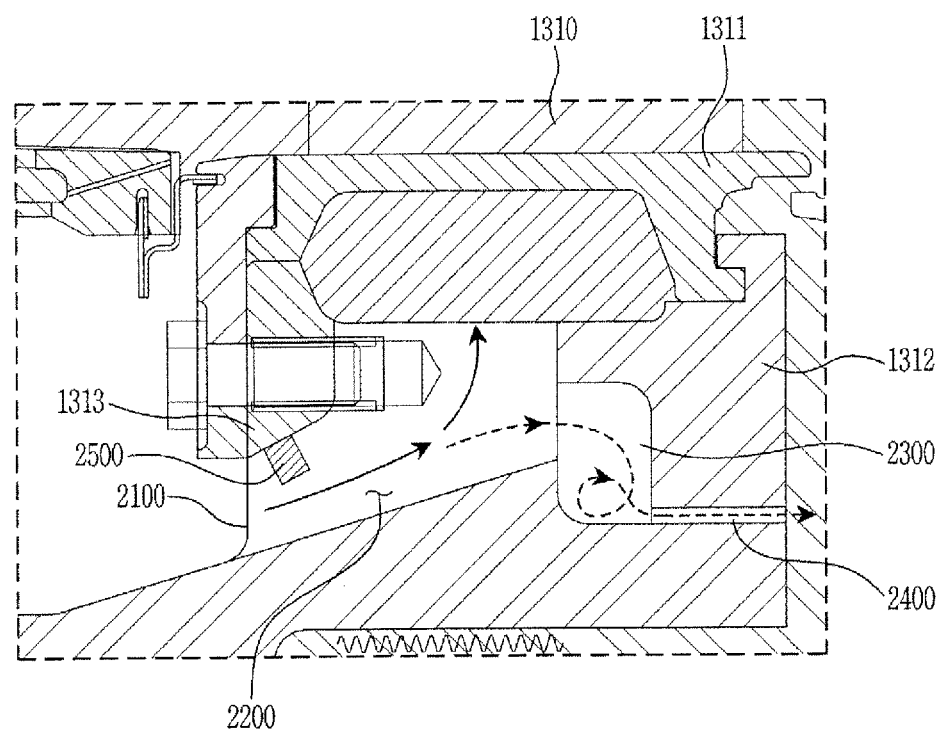
FIG. 5 is a view illustrating a particle removal device according to a second embodiment of the present invention.

FIG. 5 is a view illustrating a particle removal device according to a second embodiment of the present invention. Referring to FIG. 5, the particle removal device according to the second embodiment of the present further includes a first guide member 2500, in addition to the suction inlet 2100, the acceleration flow path 2200, the particle collector 2300, and the particle discharger 2400.

The first guide member 2500 may be configured to project from a second support member 1313, which supports the platform 1311 of the first vane 1310 in a downward direction or in a direction perpendicular to the inclined surface of the acceleration flow path 2200. The first guide member 2500 is able to reduce the cross-sectional area of the acceleration flow path 2200 and thus increase the accelerative force of the compressed air introduced through the suction inlet 2100, thereby improving the ability to separate particles from the compressed air by centrifugal force.

Figure 6:
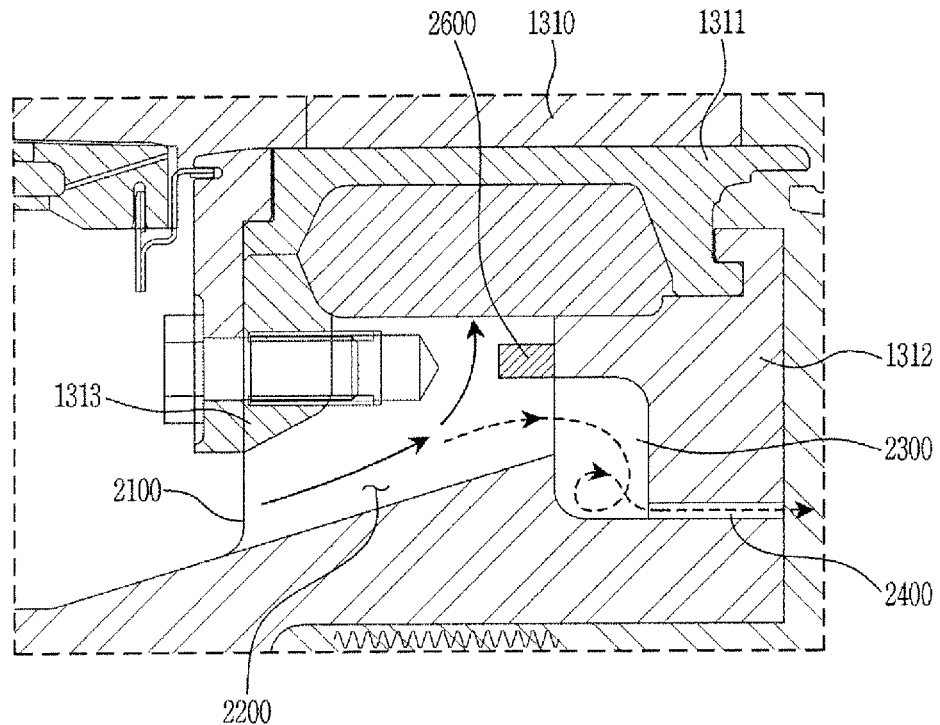
FIG. 6 is a view illustrating a particle removal device according to a third embodiment of the present invention.

FIG. 6 is a view illustrating a particle removal device according to a third embodiment of the present invention. Referring to FIG. 6, the particle removal device according to the third embodiment of the present invention further includes a second guide member 2600, in addition to the suction inlet 2100, the acceleration flow path 2200, the particle collector 2300, and the particle discharger 2400.

The second guide member 2600 may be configured to project in a horizontal direction from a side surface of the first support member 1312 that supports the platform 1311 of the first vane 1310. The second guide member 2600 serves to guide fine particles, which have a relatively low mass and are thus subjected to a lower centrifugal force, among the particles contained in the compressed air introduced through the suction inlet 2100, into the particle collector 2300. The fine particles, which are subjected to a lower centrifugal force, may be collected in the particle collector 2300 due to collision with the second guide member 2600.

Figure 7:
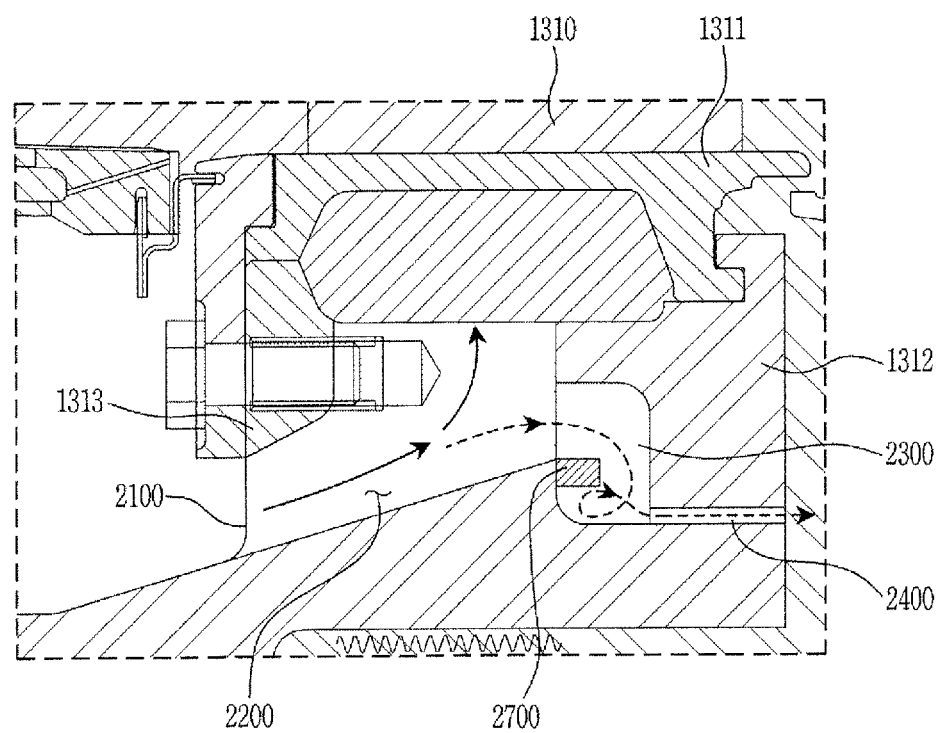
FIG. 7 is a view illustrating a particle removal device according to a fourth embodiment of the present invention.

FIG. 7 is a view illustrating a particle removal device according to a fourth embodiment of the present invention. Referring to FIG. 7, the particle removal device according to the fourth embodiment of the present further includes a third guide member 2700, in addition to the suction inlet 2100, the acceleration flow path 2200, the particle collector 2300, and the particle discharger 2400.

The third guide member 2700 may be configured to project in a horizontal direction from a downstream end of the acceleration flow path 2200. The third guide member 2700 is able not only to guide particles collected in the particle collector 2300 such that the particles are easily introduced into the particle discharger 2400 but also to inhibit the particles collected in the particle collector 2300 from flowing back.

Figure 8:
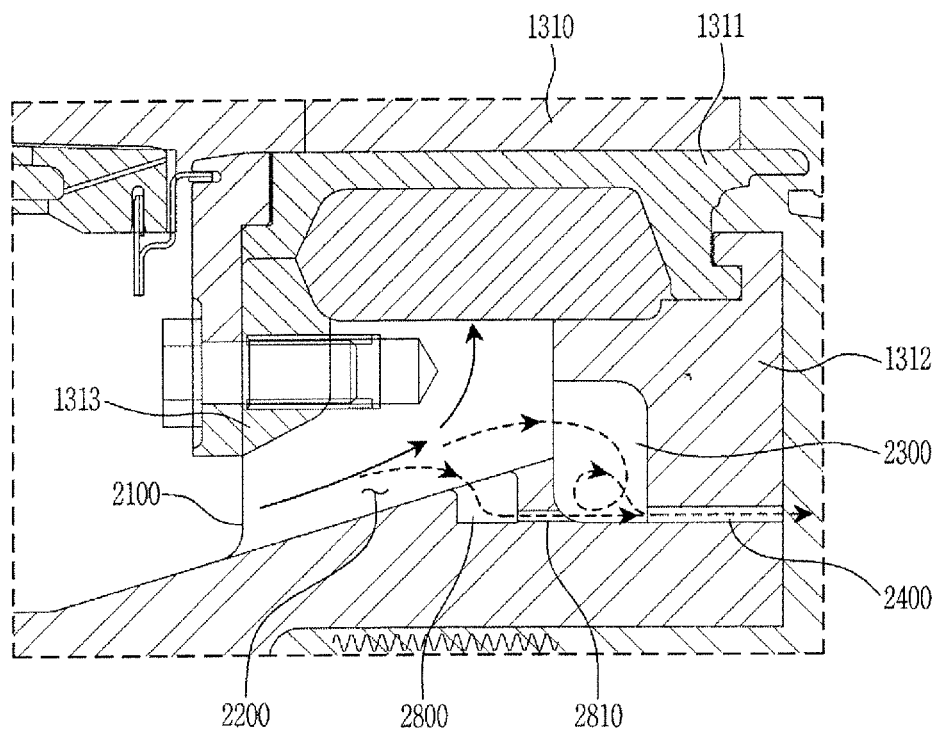
FIG. 8 is a view illustrating a particle removal device according to a fifth embodiment of the present invention.

FIG. 8 is a view illustrating a particle removal device according to a fifth embodiment of the present invention.

Referring to FIG. 8, the particle removal device according to the fifth embodiment of the present invention further includes a subsidiary particle collector 2800, in addition to the suction inlet 2100, the acceleration flow path 2200, the particle collector 2300, and the particle discharger 2400.

The subsidiary particle collector 2800 is formed by depression of a portion of the inclined surface of the acceleration flow path 2200, and is provided with a connecting passage 2810 communicating with the particle collector 2300. The subsidiary particle collector 2800 is able to collect particles that have a relatively high mass and are thus subjected to a high centrifugal force, among the particles contained in the compressed air introduced through the suction inlet 2100.

The particles, which are subjected to a high centrifugal force, come into contact with an upstream surface of the inclined surface of the acceleration flow path 2200, which is close to the compressor. Although the particles, which come into contact with the upstream surface, flow into the particle collector 2300 by virtue of the stream of compressed air, there is the concern of the particles adhering to the inclined surface of the acceleration flow path 2200 and of additional particles continuing to accumulate on the adhered particles upon operation for a prolonged period. Consequently, there is the concern that the accumulated particles will not be introduced into the particle collector 2300, but will instead be introduced into the first vane 1310 by the stream of the compressed air.

In order to inhibit such accumulation of particles, the particle removal device according to the fifth embodiment of the present invention includes the subsidiary particle collector 2800, which is provided at the inclined surface of the acceleration flow path 2200, in order to collect particles having a high mass. The particles introduced into the subsidiary particle collector 2800 are introduced into the particle collector 2300 through the connecting passage 2810, and are then discharged to the outside through the particle discharger 2400.

Figure 9:
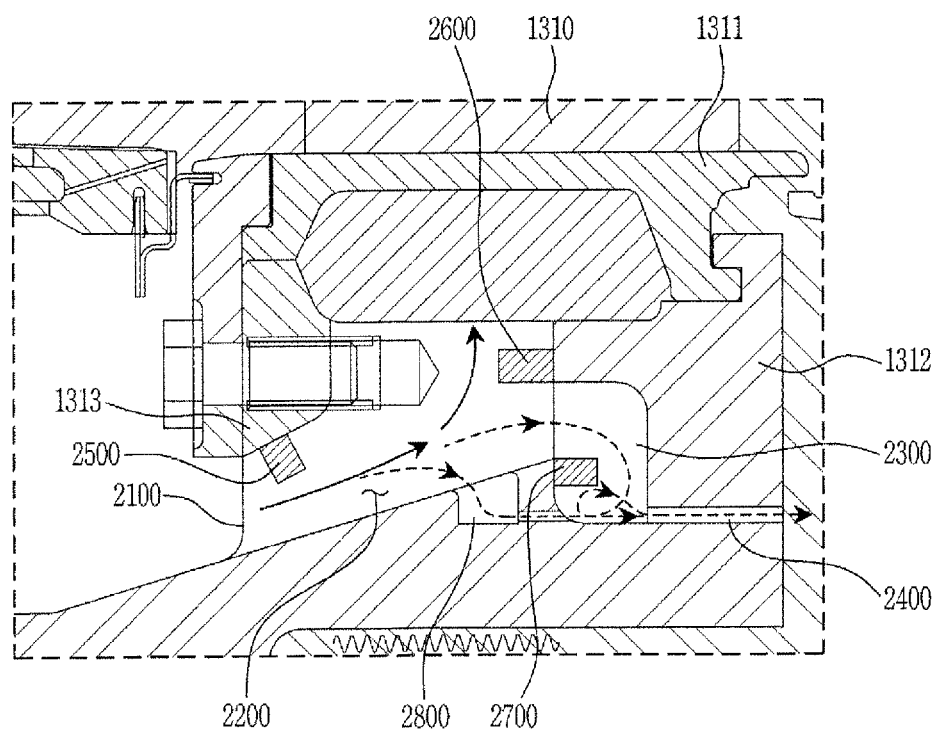
FIG. 9 is a view illustrating a particle removal device according to a sixth embodiment of the present invention.

FIG. 9 is a view illustrating a particle removal device according to a sixth embodiment of the present invention. Referring to FIG. 9, the particle removal device according to the sixth embodiment of the present invention includes all of the suction inlet 2100, the acceleration flow path 2200, the particle collector 2300, the particle discharger 2400, the first guide member 2500, the second guide member 2600, the third guide member 2700, and the subsidiary particle collector 2800.

The first guide member 2500 serves to reduce the cross-sectional area of the acceleration flow path 2200 and thus increase the accelerative force of the compressed air introduced through the suction inlet 2100, thereby improving the ability to separate particles from the compressed air by centrifugal force.

The second guide member 2600 serves to guide fine particles, which have a relatively low mass and are thus subjected to a lower centrifugal force, among particles contained in the compressed air introduced through the suction inlet 2100, into the particle collector 2300. The third guide member 2700 serves not only to guide particles collected in the particle collector 2300 such that the particles are easily introduced into the particles discharger 2400 but also to inhibit the particles collected in the particle collector 2300 from flowing back.

The subsidiary particle collector 2800 serves to collect particles, which have a relatively high mass and are thus subjected to a high centrifugal force, among the particles contained in the compressed air introduced through the suction inlet 2100.

As is apparent from the above description, according to the above embodiments of the present invention, it is possible to collect and remove particles, such as foreign substances, contained in the compressed air supplied to the first vane, thereby inhibiting clogging of the flow path.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A particle removal device for a gas turbine including a compressor for discharging compressed air, a combustor for generating combustion gas, and a first vane including a platform and an outer surface across which the combustion gas flows, the platform including first and second lower ends respectively disposed at downstream and upstream sides of the platform, the particle removal device comprising:
   a suction inlet configured to introduce the compressed air into a region below the first vane;
   an acceleration flow path communicating with the suction inlet, the acceleration flow path configured to accelerate the compressed air introduced through the suction inlet and to separate particles from the compressed air by centrifugal force;
   a first support member including an upper portion and a lower portion, the upper portion of the first support member supporting the first lower end of the platform of the first vane and having an upstream side facing the region below the first vane, the lower portion extending downward from the upper portion and having an upstream side facing the region below the first vane;
   a particle collector that is disposed downstream of the acceleration flow path and includes a pocket formed by depressing a region of the upstream side of the lower portion of the first support member such that at least a portion of the pocket extends radially inward from the acceleration flow path, the particle collector configured to collect the separated particles from the acceleration flow path; and
   a particle discharger communicating with the particle collector through the first support member so as to discharge the collected particles to an outside.

2. The particle removal device for a gas turbine according to claim 1,
   wherein the acceleration flow path includes an inclined surface adapted not only to enable the compressed air, which is introduced in a direction parallel to an axial direction of the gas turbine, to be introduced into the first vane in a direction perpendicular to the axial direction of the gas turbine but also to accelerate the compressed air, and
   wherein the inclined surface of the acceleration flow path extends from the suction inlet to the lower portion of the first support member.

3. The particle removal device for a gas turbine according to claim 1, wherein the first support member is provided at an end of the acceleration flow path and has a larger axial width than an axial width of the first lower end of the platform of the first vane.

4. The particle removal device for a gas turbine according to claim 1, wherein the particle discharger is formed in the lower portion of the first support member so as to have a pipe shape.

5. The particle removal device for a gas turbine according to claim 1, further comprising:
   a second support member supporting the second lower end of the platform of the first vane; and
   a first guide member projecting the from the second support member into the region below the first vane in a downward direction or in a direction perpendicular to an inclined surface of the acceleration flow path.

6. The particle removal device for a gas turbine according to claim 1, further comprising a second guide member projecting into the region below the first vane from the upstream side of the upper portion of the first support member in a horizontal direction.

7. The particle removal device for a gas turbine according to claim 1, further comprising a third guide member projecting into the depressed region of the upstream side of the lower portion of the first support member from one side of the acceleration flow path in a horizontal direction.

8. The particle removal device for a gas turbine according to claim 1, further comprising a subsidiary particle collector formed in a portion of an inclined surface of the acceleration flow path.

9. The particle removal device for a gas turbine according to claim 8, wherein the subsidiary particle collector includes a connecting passage communicating with the particle collector.

10. The particle removal device for a gas turbine according to claim 1, further comprising:
    a second support member supporting the second lower end of the platform of the first vane; and
    a first guide member projecting the from the second support member into the region below the first vane in a downward direction or in a direction perpendicular to an inclined surface of the acceleration flow path;
    a second guide member projecting into the region below the first vane from the upstream side of the upper portion of the first support member in a horizontal direction;
    a third guide member projecting into the depressed region of the upstream side of the lower portion of the first support member from one side of the acceleration flow path in a horizontal direction; and
    a subsidiary particle collector formed in a portion of the inclined surface of the acceleration flow path.

11. A gas turbine comprising a compressor for compressing air and discharging first and second compressed air; a combustor for discharging combustion gas produced by mixing fuel with the first corn pressed air and burning the mixture; a turbine adapted to be rotated by the discharged combustion gas so as to generate power; a first vane including a platform and an outer surface across which the combustion gas flows, the platform including first and second lower ends respectively disposed at downstream and upstream sides of the platform; and a particle removal device including:
    a suction inlet configured to introduce the second compressed air into a region below the first vane;
    an acceleration flow path communicating with the suction inlet, the acceleration flow path configured to accelerate the second corn pressed air introduced through the suction inlet and to separate particles from the second compressed air by centrifugal force;

a first support member including an upper portion and a lower portion, the upper portion of the first support member supporting the first lower end of the platform of the first vane and having an upstream side facing the region below the first vane, the lower portion extending downward from the upper portion and having an upstream side facing the region below the first vane;

a particle collector that is disposed downstream of the acceleration flow path and includes a pocket formed by depressing a region of the upstream side of the lower portion of the first support member such that at least a portion of the pocket extends radially inward from the acceleration flow path, the particle collector configured to collect the separated particles from the acceleration flow path; and a particle discharger communicating with the particle collector through the first support member so as to discharge the collected particles to an outside.

12. The gas turbine according to claim 11, wherein the acceleration flow path includes an inclined surface adapted not only to enable the compressed air, which is introduced in a direction parallel to an axial direction of the gas turbine, to be introduced into the first vane in a direction perpendicular to the axial direction of the gas turbine but also to accelerate the compressed air, and wherein the inclined surface of the acceleration flow path extends from the suction inlet to the lower portion of the first support member.

13. The gas turbine according to claim 11, wherein the first support member is provided at an end of the acceleration flow path and has a larger axial width than an axial width of the first lower end of the platform of the first vane.

14. The gas turbine according to claim 11, wherein the particle discharger is formed in the lower portion of the first support member so as to have a pipe shape.

15. The gas turbine according to claim 11, further comprising:
a second support member supporting the second lower end of the platform of the first vane; and
a first guide member projecting the from the second support member into the region below the first vane in a downward direction or in a direction perpendicular to an inclined surface of the acceleration flow path.

16. The gas turbine according to claim 11, further comprising a second guide member projecting into the region below the first vane from the upstream side of the upper portion of the first support member in a horizontal direction.

17. The gas turbine according to claim 11, further comprising a third guide member projecting into the depressed region of the upstream side of the lower portion of the first support member from one side of the acceleration flow path in a horizontal direction.

18. The gas turbine according to claim 11, further comprising a subsidiary particle collector formed in a portion of an inclined surface of the acceleration flow path.

19. The gas turbine according to claim 18, wherein the subsidiary particle collector includes a connecting passage communicating with the particle collector.

20. The gas turbine according to claim 11, further comprising:
a second support member supporting the second lower end of the platform of the first vane; and
a first guide member projecting the from the second support member into the region below the first vane in a downward direction or in a direction perpendicular to an inclined surface of the acceleration flow path;
a second guide member projecting into the region below the first vane from the upstream side of the upper portion of the first support member in a horizontal direction;
a third guide member projecting into the depressed region of the upstream side of the lower portion of the first support member from one side of the acceleration flow path in a horizontal direction; and
a subsidiary particle collector formed in a portion of the inclined surface of the acceleration flow path.

* * * * *